United States Patent
Devadoss et al.

(10) Patent No.: US 8,892,505 B2
(45) Date of Patent: Nov. 18, 2014

(54) METHOD FOR SCHEDULING A TASK IN A DATA WAREHOUSE

(75) Inventors: Madan Gopal Devadoss, Karnataka (IN); Ranveer Kumar Singh, Karnataka (IN); Panish Ramakrishna, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 508 days.

(21) Appl. No.: 12/980,348

(22) Filed: Dec. 29, 2010

(65) Prior Publication Data

US 2012/0109879 A1    May 3, 2012

(30) Foreign Application Priority Data

Oct. 28, 2010    (IN) .......................... 3230/CHE/2010

(51) Int. Cl.
G06F 7/00        (2006.01)
G06F 17/30       (2006.01)
G06F 9/48        (2006.01)

(52) U.S. Cl.
CPC ........ *G06F 17/30563* (2013.01); *G06F 9/4843* (2013.01)
USPC ........................... 707/602; 707/618; 718/102

(58) Field of Classification Search
USPC .................................. 707/602, 618; 718/102
See application file for complete search history.

(56) References Cited

U.S. PATENT DOCUMENTS

| | | | |
|---|---|---|---|
| 7,058,615 B2 | 6/2006 | Yao | |
| 7,512,614 B2 | 3/2009 | Yao | |
| 7,720,804 B2 | 5/2010 | Fazal | |
| 2005/0154627 A1* | 7/2005 | Zuzek et al. | 707/100 |
| 2005/0187991 A1* | 8/2005 | Wilms et al. | 707/204 |
| 2007/0239769 A1* | 10/2007 | Fazal et al. | 707/102 |
| 2011/0040727 A1* | 2/2011 | Golab et al. | 707/618 |

* cited by examiner

*Primary Examiner* — Hosain Alam
*Assistant Examiner* — Jieying Tang
(74) *Attorney, Agent, or Firm* — Sumit Dhingra

(57) ABSTRACT

Provided is a method and system for scheduling a task in a data warehouse. A task in a data warehouse is scheduled based on selection of a report related to the data warehouse.

17 Claims, 3 Drawing Sheets

METHOD FOR SCHEDULING A TASK IN A DATA WAREHOUSE

RELATED APPLICATIONS

Benefit is claimed under 35 U.S.C. 119(a)-(d) to Foreign application Serial No. 3230/CHE/2010 entitled "METHOD FOR SCHEDULING A TASK IN A DATA WAREHOUSE", by Hewlett-Packard Development Company, L.P., filed on Oct. 28, 2010, in INDIA which is herein incorporated in its entirety by reference for all purposes.

BACKGROUND

Data is omnipresent. Whether it's a small company employing a few people or a large corporation with thousands of employees, the need to capture, store and manage an organization's data is ever-present. With the development of technology and software tools, such as a data warehouse (DW) system, it has become relatively easier for an enterprise to manage its data.

A data warehouse is a collection of data that is extracted from one or more data sources. For example, a company might create a data warehouse that integrates data from various sources, such as, sales information, customer information, inventory information, product information, etc. The collection may help the company analyze sales figures by location, inventory details by location, customer preferences for its products, etc. A data warehouse allows the management of an enterprise to analyze data related to its organization for business decision making.

In a model driven data warehouse, the data warehouse components and ETL (extract, transform, and load) operations are modeled, generally as an XML (Extensible Markup Language) file compliant to the model. The data warehouse and ETL tasks are typically managed by a job scheduler, which runs these tasks at predefined intervals or specified time of day. In another scenario, such tasks may be event driven rather than time driven.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

As mentioned earlier, a data warehouse acts as a platform for collecting and aggregating data from diverse applications and data sources. An organization can use its data warehouse not only for storing its data for long periods but also for report generation and analysis. To achieve this aim, a data warehouse needs to be effectively managed by automating data processing and maintenance tasks. This is typically done by a job scheduler, which schedules such tasks at a predefined time. However, managing database tasks through a job scheduler has certain limitations. For one, it's not dynamic enough to adapt with the changing needs of a demanding present day business environment, where enterprises need to make critical business decisions on real time basis.

Proposed is a solution that mitigates the prior art limitations of scheduling a task in a data warehouse. Embodiments of the present solution provide a method and a system for scheduling a task in a data warehouse based on reporting requirements of an organization.

Reports are one of the end user interfaces to a data warehouse. Reports display data from the data warehouse tables that help decision makers make key business decisions. Proposed solution presents a mechanism to dynamically manage data warehouse and ETL tasks in alignment with reporting requirements.

Figure 1:
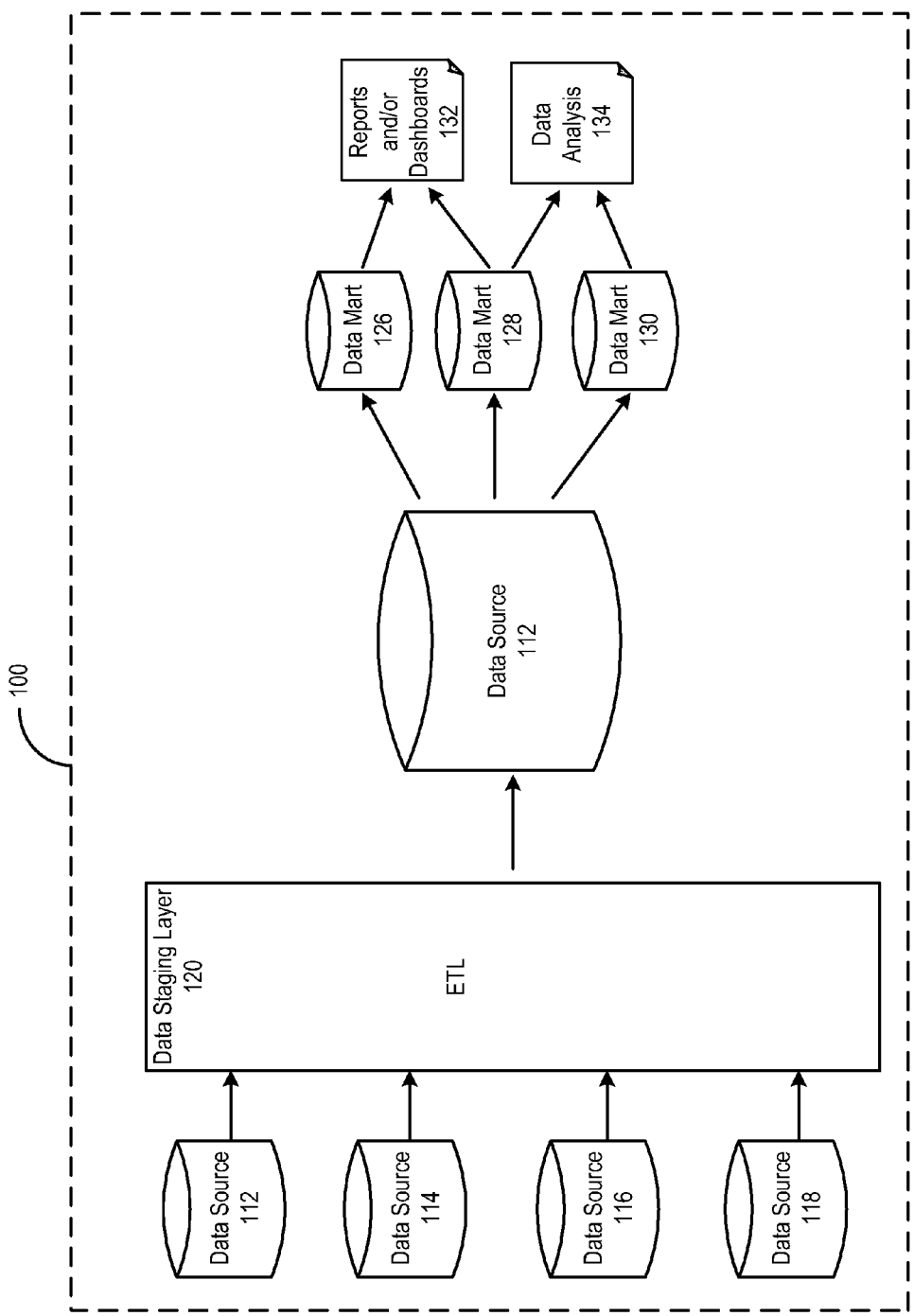
FIG. 1 shows a graphic representation of a top level view of exemplary data warehouse architecture 100 according to an embodiment.

FIG. 1 shows a graphic representation of a top level view of exemplary data warehouse architecture 100 according to an embodiment.

A data warehouse (DW) architecture is based on a number of factors. Some of these factors include: business processes within an enterprise, data structure, security, data modeling and organization, query requirements, meta data management, analytics and reporting requirements, etc.

Referring to FIG. 1, the data warehouse architecture 100 includes data sources 112, 114, 116 and 118, a data staging layer 120, a data warehouse 122, a metadata repository 124, data marts 126, 128 and 130, report generation 126 and analysis 128.

The data staging layer 120 includes a data staging process, which may further includes three sub-processes, namely, Extract, Transform and Load. These sub-processes are referred to as an ETL process. The Extract sub-process includes extraction of data from different sources and applications. In the present example, sub-process extracts data from includes data sources 112, 114, 116 and 118. The kind and complexity of data sources may vary depending on the nature of computer applications and processes involved. For example, computer systems, network elements, computer databases and other applications may act as data sources. The Transform sub-process involves transformation of data, such as, conversion, aggregation and cleaning of data. The Load sub-process involves loading of data at a target location or an intermediate system for further processing. The ETL process results in collection, aggregation and reconciliation of data from multiple data sources.

The collected and reconciled data is moved into the data warehouse 122 where it is summarized and archived for reporting purposes. The complete data flow process, from data collection to business view of the data, is specified by metadata stored in the metadata repository 124. Metadata repository 124 specifies the relational schema definition, the staging and loading rules, the aggregation rules and the business view layer.

The data warehouse architecture may have data marts 126, 128, and 130, which are specialized repositories meant for a particular unit of a business. They are designed to focus on specific business functions within an organization. For example, there may be separate data marts for sales, finance, production, human resource and inventory. Each of these would contain data pertaining to a specific business unit. The data in data warehouse 122 and/or data marts 126, 128 and 130 is used for generating reports (and/or) dashboards 132 for a user and data analysis 134.

Figure 2:
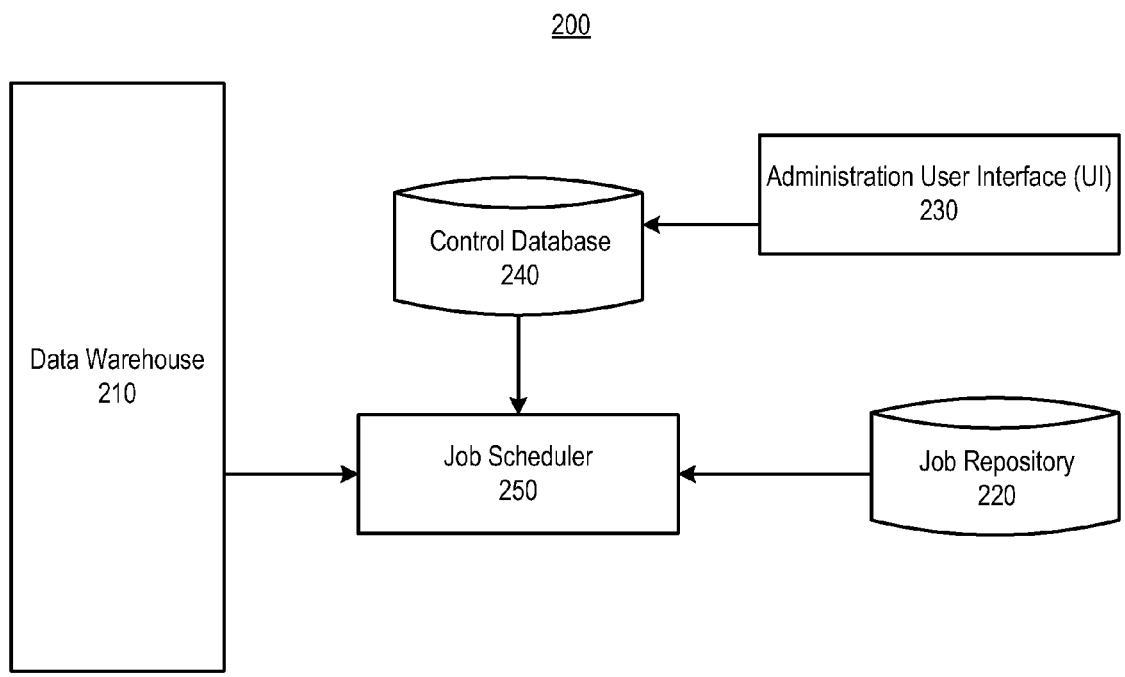
FIG. 2 shows a graphic representation of exemplary data warehouse architecture 200 according to an embodiment.

FIG. 2 shows a graphic representation of exemplary data warehouse architecture 200 according to a present embodiment.

Referring to FIG. 2, the data warehouse architecture 200 includes a data warehouse model 210, a job repository 220, an administration user interface (UI) 230, a control database 240 and a job scheduler 250. All these components may be implemented in the form of modules.

The term "module", as used herein, means, but is not limited to, a software or hardware component. A module may include, by way of example, components, such as software components, processes, functions, attributes, procedures, drivers, firmware, data, databases, and data structures. The module may reside on a volatile or non-volatile storage medium and configured to interact with a processor of a computer system.

The data warehouse model 210 contains information related to the data warehouse. It includes details of physical tables, details of business view and its mapping to physical tables, details of data warehouse tasks linked to physical tables, details of ETL tasks and their mapping to physical tables, details of various reports and its mapping to business view.

The job repository 220 contains the parent-child dependency details of the data warehouse and ETL tasks. Parent-child or hierarchical relationships are a typical feature of most data warehouses. They define the relationship between two entities.

The administration user interface (UI) 230 allows selection of reports of interest. Since an end user may have access to different types of reports that may be available for a data warehouse, the user interface 230 allows a user to select one or more reports of his or her choice. The UI lists the available reports for a user to make a selection. The reports allow an enterprise to analyze its business services and IT applications.

The control database 240 contains the control tables that are required to store the data warehouse metadata.

The job scheduler 250 is configured to identify and schedule only the relevant tasks for execution based on reports selected. The relevant task may be data warehouse tasks and/or ETL tasks.

Figure 3:
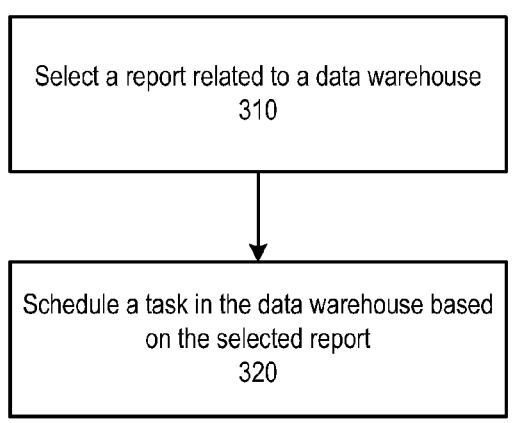
FIG. 3 shows a flow chart of a computer-implemented method for scheduling a task in a data warehouse according to an embodiment.

FIG. 3 shows a flow chart of a computer-implemented method for scheduling a task in a data warehouse according to an embodiment.

Step 310 includes selecting a report related to a data warehouse. As mentioned earlier, a data warehouse typically offers a variety of reports to a user of a data warehouse. These reports allow a user to view the data residing in a data warehouse in multiple ways and various formats. For example, there may be separate reports for customers, sales and products of a company, or there may be combined reports that capture data from two different components (for example, customer and products). Reports provide a meaningful way to capture the essence of data residing in a data warehouse. Reports may also be generated in different formats, such a document file, a spreadsheet, a presentation file, an email, etc. Various reporting tools are available that are capable of generating a multitude of reports depending on customer needs.

In an embodiment, a user interface may be provided for a user (for example, an administrator) to select a report of his or her choice. The user interface may list the available reports for a user to make a selection. The interface may also allow a user to customize a report of his or her choice.

Step 320 includes scheduling a task in the data warehouse based on the selected report. Once a user has selected a report that he or she wants to view for a data warehouse, the method schedules a task based on the selected report. The various steps involved in the selection of a task in the data warehouse based on the selected report are mentioned below. A job scheduler may identify a list of tasks associated with a selected report(s).

Firstly, at least one business view associated with the selected report is identified. The identification may be carried out by querying the data warehouse model of the data warehouse.

In an embodiment, the data warehouse is assumed to have a three layered architecture. The top layer is the reporting layer, the middle layer is the business view layer and the bottom layer is the data layer. The reporting layer is used for generating reports on the data present in a data warehouse. The business view layer provides a mapping between business processes of an enterprise and the data in the data warehouse. The data layer manages the data present in the data warehouse (physical tables, etc.).

In the present case, at least one business view associated with a selected report is identified.

Secondly, at least one physical table associated with the identified business view is identified. The identification may be carried out by querying the data warehouse model of the data warehouse. In case there is more than one physical table associated with the identified business view, all of them are identified.

Thirdly, at least one task associated with the identified physical table is identified. The identification may again be carried out by querying the data warehouse model of the data warehouse. If there is more than one task associated with the identified physical table, all tasks are identified. The tasks may be data warehouse tasks or ETL (extract, transform, and load) tasks. Extract tasks involve extracting the data from various data source systems. Transform tasks involve taking the raw data from the staging area and doing cleansing, reformatting, aggregation, etc. that is required to get the data into the final format for reporting. Load tasks include loading data into an end target, usually the data warehouse.

The lists of ETL and data warehouse tasks linked to a physical table are identified by querying the data warehouse model.

Further, in an embodiment, sequence of task execution of ETL and data warehouse tasks is identified by querying the job repository of the data warehouse. A list of dependent tasks is also identified by querying the job repository.

All tasks associated with a report are identified by employing the above steps. Once identified, a job scheduler schedules the retrieved tasks and dependent tasks for execution in the correct order.

Figure 4:
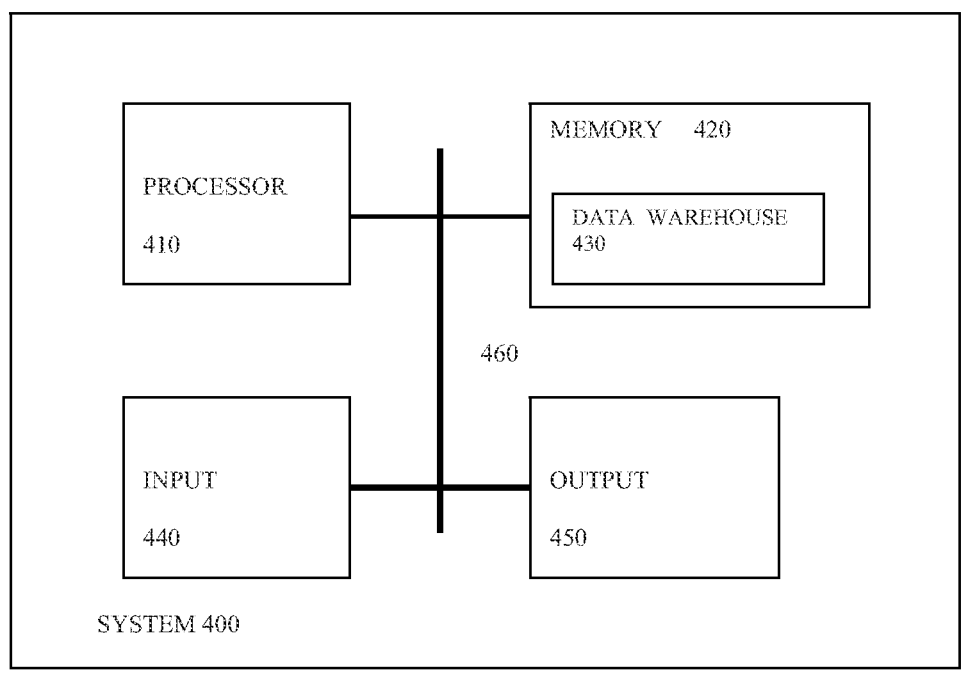
FIG. 4 shows a block diagram of a computing system according to an embodiment.

FIG. 4 shows a block diagram of a computing system according to an embodiment.

The system 400 may be any kind of computing device, such as, but not limited to, a personal computer, a desktop computer, a laptop computer, a notebook computer, a network computer, a personal digital assistant (PDA), a mobile device, a hand-held device, or any other suitable computing. Further, the system 400 may be a standalone system or a network system (such as, but not limited to, a client/server architecture) connected to other computing devices through wired or wireless means.

The system 400 may include a processor 410, for executing software instructions, a memory 420, for storing a data warehouse 430, an input device 440 and an output device 450. These components may be coupled together through a system bus 460.

The processor 410 is arranged to schedule a task in the data warehouse based on a report selected through the input device 440. The report is related to the data warehouse.

The memory 420 may include computer system memory such as, but not limited to, SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. The memory 420 stores the data warehouse 430.

The input device 440 may include a mouse, a key pad, a touch pad or screen, a voice recognizer, and the like, for providing an input involving selection of a report related to the data warehouse 430.

The output device 450 may include a Virtual Display Unit (VDU), a printer, a scanner, and the like, for selecting a report related to the data warehouse 430 and scheduling a task in the data warehouse based on the selected report.

It would be appreciated that the system components depicted in FIG. 4 are for the purpose of illustration only and the actual components may vary depending on the computing system and architecture deployed for implementation of the present solution. The various components described above may be hosted on a single computing system or multiple computer systems, including servers, connected together through suitable means.

The embodiments described provide an effective mechanism for a report driven task scheduling for data warehouse and ETL tasks that avoids redundant job execution and dynamically selects the relevant jobs based on selection of reports of interest through a user interface.

It will be appreciated that the embodiments within the scope of the present solution may be implemented in the form of a computer program product including computer-executable instructions, such as program code, which may be run on any suitable computing environment in conjunction with a suitable operating system, such as, Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present solution is for the purpose of illustration only. Although the solution has been described in conjunction with a specific embodiment thereof, those skilled in the art will appreciate that numerous modifications are possible without materially departing from the teachings and advantages of the subject matter described herein. Other substitutions, modifications and changes may be made without departing from the spirit of the present solution.

The invention claimed is:

1. A computer-implemented method for scheduling a task in a data warehouse, comprising:
    identifying a report related to the data warehouse from previously created reports;
    store a data warehouse model, wherein the data warehouse model includes details of physical tables in the data warehouse, details of the reports, and mappings between the physical tables in the data warehouse and a task associated with each physical table, wherein the physical tables include at least two different physical tables, and each of the at least two different physical tables is associated with a different task in the stored mappings;
    determining one of the physical tables associated with the identified report;
    querying the stored mappings of the data warehouse model with the determined physical table;
    determining the task mapped to the determined physical table from results of the querying of the stored mappings; and
    scheduling the task in the data warehouse in response to the identifying of the report and the determining of the task mapped to the determined physical table from the results of the querying of the stored mappings.

2. The method according to claim 1, comprising:
    identifying at least one business view associated with the identified report; and
    the determining of one of the physical tables associated with the identified report includes identifying at least one physical table associated with the identified at least one business view.

3. The method according to claim 2, further comprising identifying sequence of task execution, in case more than one task is associated with the identified report.

4. The method according to claim 2, further comprising identifying any tasks dependent on the task mapped to the determined physical table.

5. The method according to claim 1, wherein the task is an ETL (extract, transfer, and load) task.

6. The method according to claim 1, wherein the task is a data warehouse task.

7. The computer-implemented method of claim 1, wherein the mappings include a plurality of data warehouse tasks and a plurality of extract, transform, and load tasks associated with the physical tables.

8. The computer-implemented method of claim 1, wherein identifying the report comprises receiving a user selection of the report from the previously created reports.

9. A system, comprising:
    a data storage device to store a data warehouse model, wherein the data warehouse model includes details of physical tables in a data warehouse, details of reports related to the data warehouse, and mappings between the physical tables in the data warehouse and a task associated with each physical table, wherein the physical tables include at least two different physical tables, and each of the at least two different physical tables is associated with a different task in the stored mappings;
    an input system to identify a report of the reports related to the data warehouse; and
    a processor to
        determine one of the physical tables associated with the identified report;
        query the stored mappings of the data warehouse model with the determined physical table;
        determine the task mapped to the determined physical table from results of the querying of the stored mappings; and
        schedule the task in the data warehouse in response to identifying the report and determining the task mapped to the determined physical table from the results of the querying of the stored mappings.

10. The system according to claim 9, wherein the processor is to
    identify at least one business view associated with the identified report; and identify the determined physical table from the physical tables that is associated with the identified at least one business view.

11. The system according to claim 9, wherein the task is an ETL (extract, transfer, and load) task.

12. The system according to claim 9, wherein the task is a data warehouse task.

13. The system of claim 9, wherein the mappings include a plurality of data warehouse tasks and a plurality of extract, transform, and load tasks associated with the physical tables.

14. A non-transitory computer readable medium including a computer program comprising machine readable instructions executable by a processor to:
    identify a report related to a data warehouse from previously created reports;
    store a data warehouse model, wherein the data warehouse model includes details of physical tables in the data warehouse, details of the reports, and mappings between the physical tables in the data warehouse and a task associated with each physical table, wherein the physical tables include at least two different physical tables, and each of the at least two different physical tables is associated with a different task in the stored mappings;
    determine a physical table associated with the identified report from the physical tables in the data warehouse;
    query the stored mappings of the data warehouse model with the determined physical table;
    determine the task mapped to the determined physical table from results of the querying of the stored mappings; and
    schedule the task in the data warehouse in response to the identifying of the report and the determining of the task mapped to the determined physical table from the results of the querying of the stored mappings.

15. The non-transitory computer readable medium of claim 14, wherein the instructions comprise instructions to
    identify at least one business view associated with the identified report; and
    identify the determined physical table from the physical tables that is associated with the identified at least one business view.

16. The non-transitory computer readable medium of claim 14, wherein the task is an ETL (extract, transfer, and load) task.

17. The non-transitory computer readable medium of claim 14, wherein the mappings include a plurality of data warehouse tasks and a plurality of extract, transform, and load tasks associated with the physical tables.

* * * * *